(12) United States Patent
Woll et al.

(10) Patent No.: US 8,046,245 B1
(45) Date of Patent: Oct. 25, 2011

(54) SYSTEMS AND METHODS FOR OPTIMIZING PROPERTY RISK RATINGS

(75) Inventors: Richard G. Woll, Livermore, CA (US); Margaret A. Brinkmann, Palo Alto, CA (US); Rosemary C. Peck, Oak Lawn, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 12/820,617

(22) Filed: Jun. 22, 2010

Related U.S. Application Data

(63) Continuation of application No. 11/041,469, filed on Jan. 25, 2005, now Pat. No. 7,769,608.

(60) Provisional application No. 60/574,576, filed on May 27, 2004.

(51) Int. Cl.
*G06Q 40/00* (2006.01)
(52) U.S. Cl. .......................................................... 705/4
(58) Field of Classification Search ........................ 705/4
See application file for complete search history.

(56) References Cited

U.S. PATENT DOCUMENTS

| | | | |
|---|---|---|---|
| 7,441,197 B2 | 10/2008 | Tschiegg et al. | |
| 2002/0091550 A1* | 7/2002 | White et al. | 705/4 |
| 2004/0186753 A1* | 9/2004 | Kim et al. | 705/4 |
| 2005/0055248 A1 | 3/2005 | Helitzer et al. | |
| 2006/0100912 A1 | 5/2006 | Kumar et al. | |
| 2010/0070309 A1 | 3/2010 | Deede et al. | |

OTHER PUBLICATIONS

Mills et al., "Insurers in the Greenhouse," Journal of Insurance Regulation, Fall 2002, v21n1, pp. 43-78.

* cited by examiner

*Primary Examiner* — Charles Kyle
*Assistant Examiner* — Seth Weis
(74) *Attorney, Agent, or Firm* — Finnegan, Henderson, Farabow, Garrett & Dunner, LLP

(57) ABSTRACT

Systems and methods provide optimized property risk ratings and, more particularly, optimized property risk ratings defined by evaluating ratings on a by peril basis. Systems and methods also price insurance products and underwrite insurance products using risk data that has been optimized on a by peril basis. A territory is subdivided into a plurality of regions determined in accordance with at least one predetermined factor. Loss costs representing historic costs for various insured perils are retrieved from a computerized database using a data processor. The loss costs are sorted on a per-peril basis for each of the regions using the data processor. Peril zones are created for each peril that represent related regions in which loss costs for a particular peril are roughly equivalent.

18 Claims, 5 Drawing Sheets

$P = [Q^*B_z] + C$ $P = [Q*B_z]+C$

SYSTEMS AND METHODS FOR OPTIMIZING PROPERTY RISK RATINGS

RELATED APPLICATION

This application is a continuation of and claims the benefit of priority of U.S. patent application Ser. No. 11/041,469, filed Jan. 25, 2005 now U.S. Pat. No. 7,769,608, which claims the benefit of priority from U.S. Provisional Application No. 60/574,576, entitled "Systems and Methods for Optimizing Property Risk Ratings," filed May 27, 2004, the entire contents of both of which are expressly incorporated herein by reference.

TECHNICAL FIELD

The present invention relates to systems and methods for optimizing property risk ratings and, more particularly, to optimizing property risk ratings by evaluating ratings on a by-peril basis. The present invention also provides systems and methods for pricing insurance products and underwriting insurance products using risk data that has been optimized on a by-peril basis.

BACKGROUND

Generally, insurance is an agreement by which an insurer, sometimes referred to as an underwriter, in exchange for consideration, undertakes to indemnify the insured party against loss, damage, or liability arising from certain covered risks, subject to certain conditions and limits. The consideration paid by an insured party is typically referred to as a premium, which is paid to keep the insurance in effect. In general, an insurance policy is a contract of insurance that defines the rights and duties of the contracting parties. A typical insurance policy includes limits on the amount of risk that the insurer will cover.

For the purposes of this application, an insurance product includes more than the insurance policy. It also includes services, distribution channels, and other components which may impact the customer experience.

One type of insurance is property insurance. Property insurance protects persons or businesses from financial loss caused by perils. Perils may include, but are not limited to, losses due to fire, water, earthquake, wind, explosions, aircraft damage (as when an aircraft crashes into a structure), lightning, hail, riot or civil commotion, smoke, vandalism, falling objects, theft, volcanic eruptions, and freezing. An insurance policy providing property insurance may cover some or all of these categories of perils. By paying a premium on a regular basis, a policyholder is therefore insured against a loss caused by a peril within the scope of the policy.

A current method typically used for pricing and underwriting property insurance generally uses an aggregate of loss costs resulting from all perils. In other words, all loss costs are summed over all perils, and an average loss value is used to help determine policy premiums for all policyholders. Loss costs refer to the amount paid by an insurance company when settling a policyholder's claim. This methodology, however, does not necessarily identify a loss experience for a portion of insured persons because many policyholders have a significantly higher or lower exposure to perils than the average policyholder.

An insurer might like to even more accurately assess risk exposure and to offer its customers premiums that are even more in line with the risks associated with customers' exposure to different peril combinations. Insurance companies could achieve this objective with better information and processes to manage their risk exposure so that they can more accurately access their risk exposure and, in doing so, offer customers less likely to incur losses lower rates.

SUMMARY

Consistent with the present invention, a method is provided for forming peril zones for property risk ratings. The method comprises subdividing a territory into a plurality of regions determined in accordance with at least one predetermined factor; retrieving loss costs from at least one computerized database using a data processor, the loss costs representing historic costs for various insured perils; sorting the loss costs on a per-peril basis for each of the regions using the data processor; and creating peril zones for each insured peril using the data processor, the peril zones representing regions in which loss costs for a corresponding peril are roughly equivalent.

Also consistent with the present invention, a system is provided for forming peril zones to provide property risk ratings. The system comprises a processor; a module that subdivides a territory into a plurality of regions determined in accordance with at least one predetermined factor; a database that stores loss costs representing historic costs for various insured perils; a module that sorts the loss costs on a per-peril basis for each of the regions; and a module that creates peril zones for each peril, the peril zones representing regions in which loss costs for a corresponding peril are roughly equivalent.

BRIEF DESCRIPTION OF THE DRAWINGS

All descriptions are exemplary and explanatory only and are not intended to restrict the claimed invention. The accompanying drawings, which are incorporated in and constitute a part of this specification, illustrate embodiments of the invention and, together with the description, serve to explain the principles of the invention. In the drawings:

DETAILED DESCRIPTION

Figure 1:
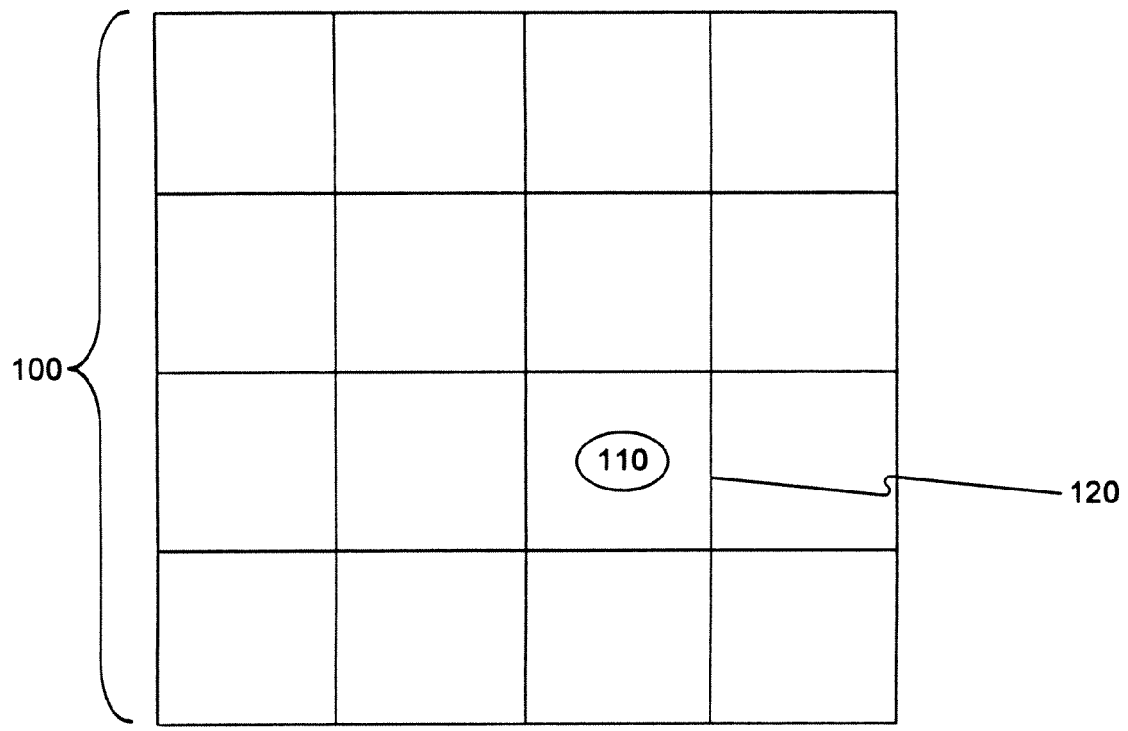
FIG. 1 is an exemplary diagram illustrating how a property in a territory is assigned rating factors that are used to calculate insurance premiums.

Systems and methods consistent with the present invention provide insurance products based upon more accurate pricing models than conventionally used in the insurance industry. To provide an increased degree of accuracy, policies are defined on a by-peril basis to take into account the frequency and intensity of perils in a particular region when formulating premiums. By-peril is an improvement over traditional pricing methodologies because the method more accurately identifies individual peril contributions and associated costs than conventional methodologies.

Another benefit to the by-peril methodology is that by understanding the likelihood of a given set of perils for a structure located in a defined region, customers can make appropriate choices to minimize risk of loss and potentially the premiums. Thus, the by-peril methodology can be used to develop more individualized risk profiles for consumers, and allow the benefit of optimized pricing that better reflects their particular risk factors.

With the advent of improved computing capabilities, it is also practical to acquire loss data by peril in a geographical region, determine the loss costs caused by given perils, and use the data to more accurately determine insurance premiums. Systems and methods consistent with the present invention improve an insurance company's understanding of how different perils affect a given region. The insurance company may then use the data to more accurately define property insurance premiums. In particular, property insurance rates are determined based on the frequency and severity of specific perils within a given geographical region, as well as take into consideration customer factors such as replacement cost of the property, fire protection, and prior claim activity.

All loss data that is currently available to an insurance company is optimized through a series of processes that produce rating zones and rating plan factors. The by-peril method uses losses by peril to determine rating zones and rating plan factors. To create rating zones within a given territory, data is broken down geographically to a level much smaller than the whole territory. For example, a territory can be defined as a state. A state's loss cost data can be further broken down to the zip code, county, or census block level. Accordingly, a geographically defined region can be any convenient subset of the defined territory. At the zip code level, for example, data is further classified by type of peril. Specific peril data is then analyzed to create zones whose zip codes have similar magnitudes of loss for the given peril.

For example, consider a state that has water peril losses varying greatly across the state. Analyzing data at a zip code level can lead to a map that shows the relative magnitudes of water peril losses across the state. Geographically defined regions with similar magnitudes of loss costs within a particular territory can then be easily identified.

The magnitude of loss cost relativities is next determined for each peril. The by-peril territories are then combined to form new by-peril-based zones. The relativity magnitudes for these new zones can then be used in standard premium calculations. Alternatively, the new zones can be used as part of a new type of premium calculation that is by peril.

For the purposes of determining factors for rating plans such as replacement cost, fire protection, and claim rating, the data can be classified by type of peril. Then, for each peril, the data can then be analyzed to determine rating plan factors for each rating plan. The by-peril factors can be combined to form by peril-based all-peril factors, either for an entire state, or for each zone within a state, where we define zones as collections of geographically defined regions, which can be used in standard premium calculations. Alternatively, the by-peril factors can be used as part of a by-peril premium calculation.

Reference will now be made in detail to exemplary embodiments of the invention, examples of which are illustrated in the accompanying drawings. Wherever possible, the same reference numbers will be used throughout the drawings to refer to the same or like parts.

FIG. 1 is an exemplary diagram illustrating how a property in a territory is assigned rating factors that are used to calculate insurance premiums. In the following example, premiums are calculated based on an aggregate of all perils in a particular zone within a larger territory. For example, a property 110 is located in a geographically defined territory, which may be defined as state 100. State 100 is divided into smaller geographically defined regions such as zip codes. Although zip codes are used in this example, any manner of division is possible. Property 110 is located in zip code 120.

Next, a state base rate is derived from historical data. In particular, the state base rate may be determined by summing together all costs, including loss costs and insurance company expenses, experienced over a given time period, modified to reflect any changes expected between the time the data is collected and the time the proposed rates are expected to be in effect. To determine a premium for a particular region, such as zip code 120, the following equation may be used: $P=[Q*B_z]+C$, where P represents the premium price for the insurance policy, Q is a product of rating plan relativities based on characteristics of the applicant that are not by peril and may vary depending on rating characteristics of a particular applicant, $B_z$ is a base rate for a region z, such as zip code 120, which is derived from all peril data, and C is an additive premium that may reflect endorsements and surcharges or discounts, for example. An endorsement is a document used to amend the coverage in an otherwise complete policy. A surcharge or discount may be an adjusted amount added to or subtracted from the premium to take into account other considerations.

Figure 2:
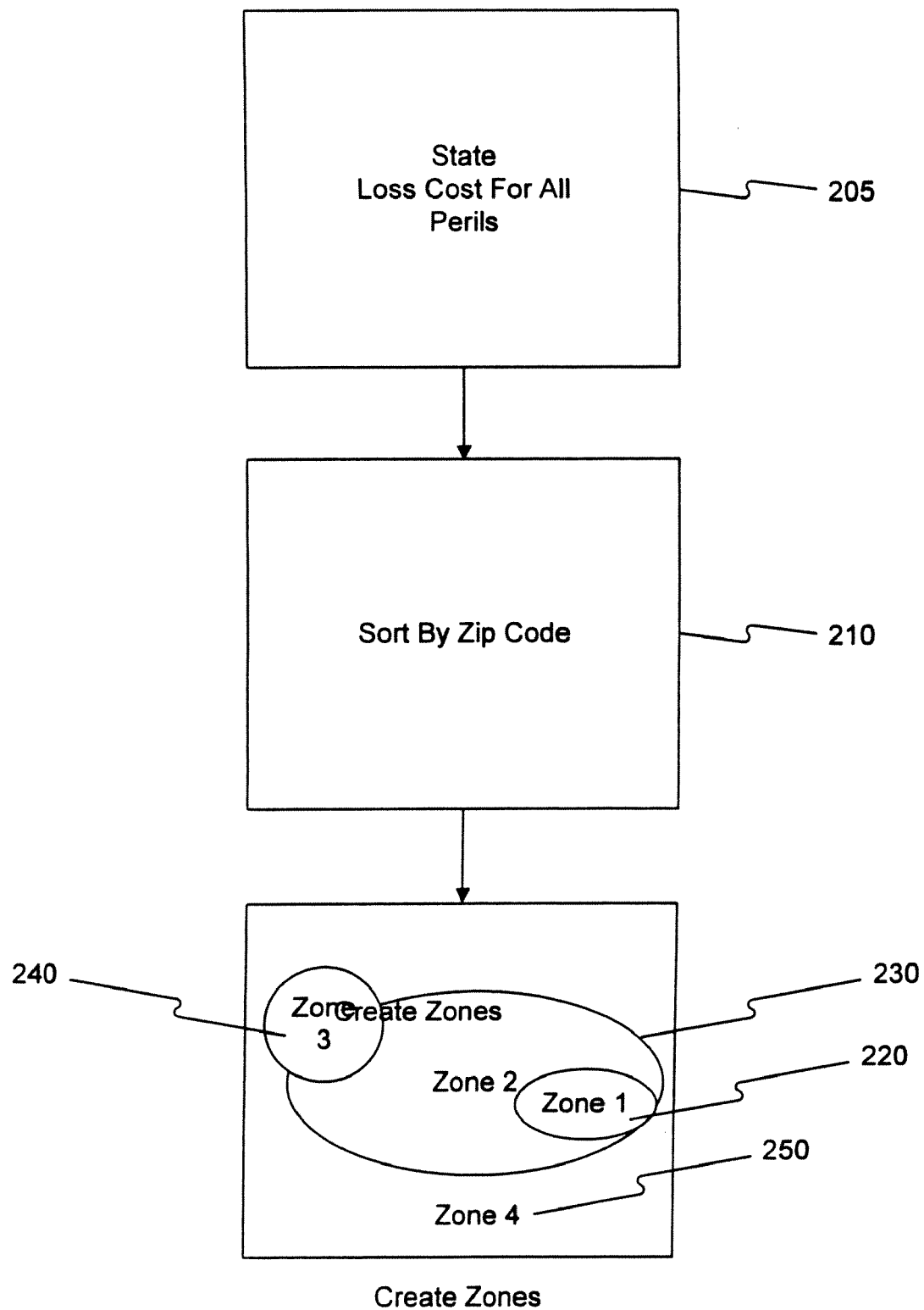
FIG. 2 is a block diagram of an example of a methodology that uses all peril data to create zones.

FIG. 2 is a block diagram of an example of a methodology that uses all peril data to create zones. First, one determines from an insurance company's records peril data 205 representing loss costs for all perils that have occurred in a particular territory over a predetermined period of time. In particular, zones of combined perils are created by first identifying the costs of individual perils over a large territory typically the size of a state. In the present example, the territory being considered is a state. Peril data 205 includes data for all perils, where applicable, such as losses due to fire, water, earthquake, wind, explosions, aircraft damage (as when an aircraft crashes into a structure), lightning, hail, riot or civil commotion, smoke, vandalism, falling objects, theft, volcanic eruptions, and freezing.

Next, the method sorts peril data 205 into sorted peril data 210 based upon a geographical subdivision of the state, such as by zip codes. In particular, peril data 205 is broken down into a convenient and commonly used regions, such as zip codes. The use of states and zip codes are convenient units, but other geographical units may be used as well.

Finally, sorted peril data 210 is used to form boundaries to form zones 220-250. The analysis used to form zones may involve statistical data smoothing techniques to create boundaries. Zones 220-250 represent groupings determined based on the magnitudes of the all peril data.

Figure 3:
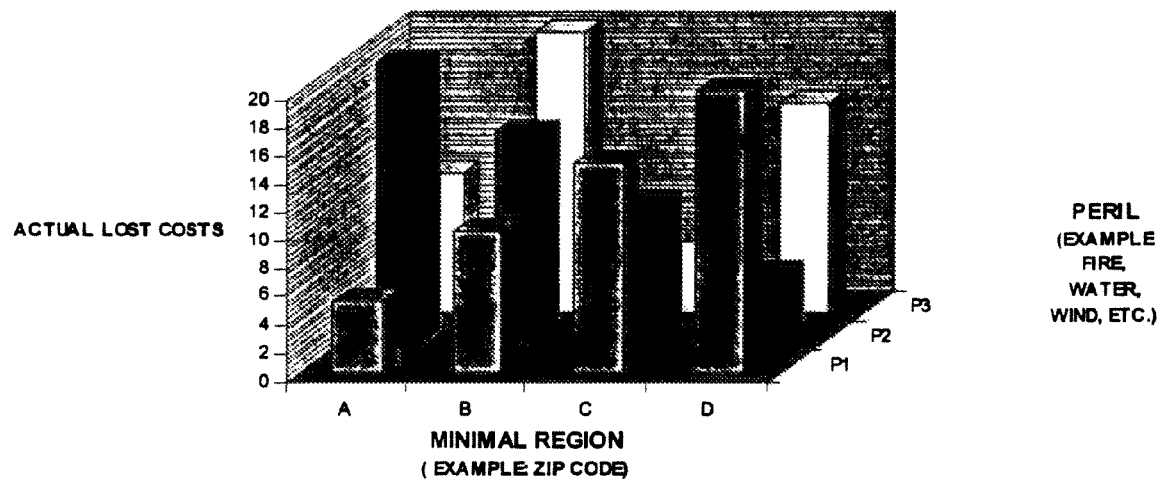
FIG. 3 is a graphical representation of a distribution of individual perils across a territory.

FIG. 3 is a graphical representation of a distribution of individual perils across a territory. The results are tabulated on the basis of geographically defined regions, such as a zip code. The individual perils are designated as P1, P2, and P3, which contribute different loss costs. The loss costs are defined as claims payments paid by an insurance company to settle losses incurred by policyholders. Loss costs are typically different for a given peril from one year to the next and therefore is usually calculated from multi-period data where one period of time is a year.

Figure 4:
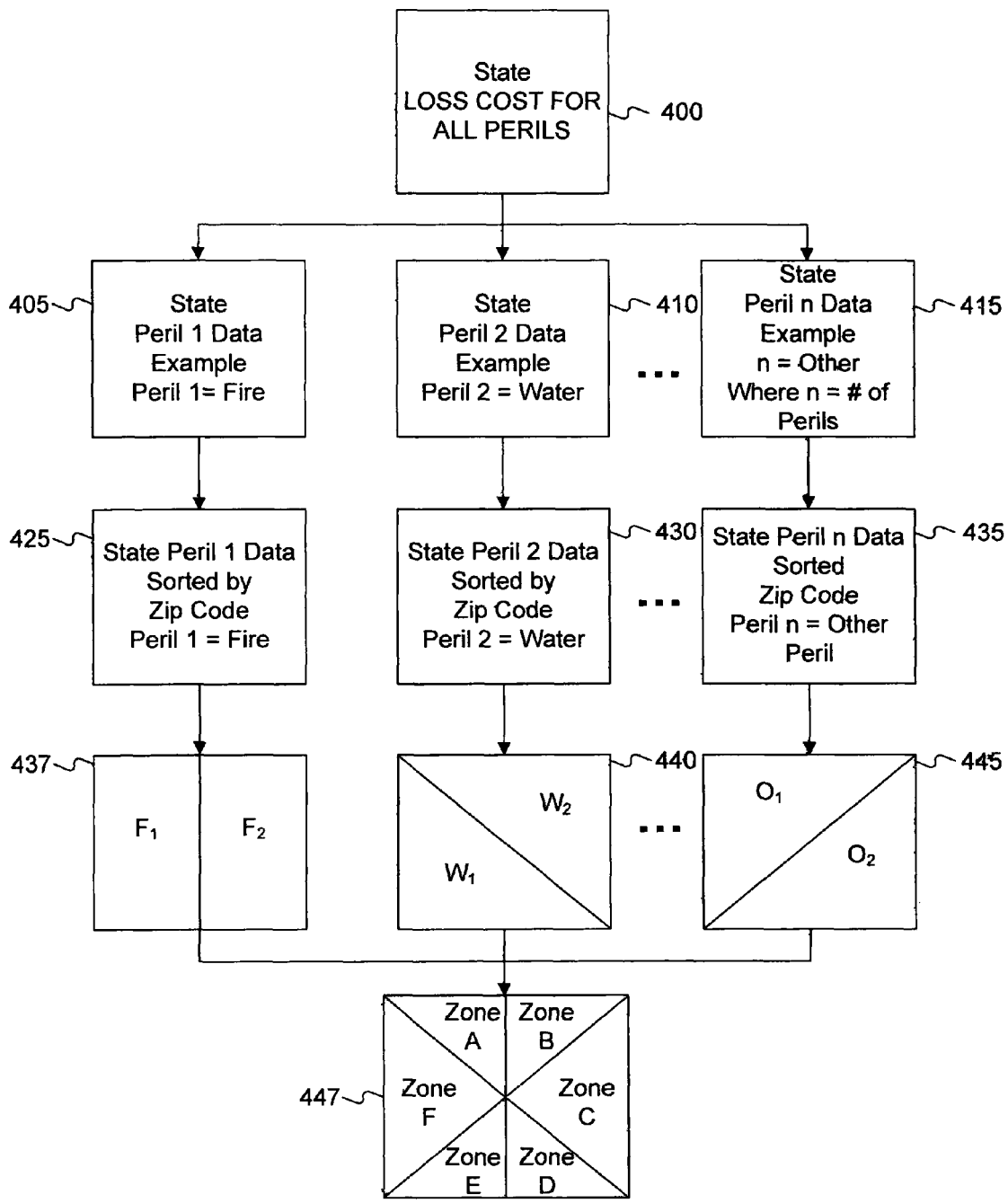
FIG. 4 is a diagram of a process for creating by peril-based all-peril zones.

FIG. 4 is a diagram of a process for creating by peril-based all-peril zones. First, a territory, such as a state, is selected. Loss costs data 400 for all perils that have occurred in the selected state over a predetermined period of time are obtained. Next, loss costs data 400 for all perils are categorized by peril. For example, the selected state may have peril data for fires, water damage, and a category for all other perils. State peril data 405 includes all loss costs due to fires; state peril data 410 includes all loss costs due to water; and state peril data 415 includes all loss costs due to other perils.

Next, state peril data 405-415 is sorted on a per-peril basis by geographically defined regions. Accordingly, sorted state peril data 425 includes all loss costs due to fires sorted by a geographically defined region, such as a zip code; sorted state peril data 430 includes all loss costs due to water damage sorted by zip code; and sorted state peril data 435 includes all loss costs due to other perils sorted by zip code.

Sorted state peril data 425-435 is then used to divide the state into peril zones. For example, peril zones 437 include fire zones $F_1$ and $F_2$; peril zones 440 include water damage zones $W_1$ and $W_2$; and peril zones 445 include other peril zones $O_1$ and $O_2$. Peril zones 437-445 may be determined by examining sorted state peril data 425-435 to create appropriate peril zone boundaries. For example, statistical techniques may be used to create boundaries. Alternatively, boundaries may be determined or adjusted by visual inspection.

Peril zones 437-445 may then be combined to form an overall by peril based all peril zone 447, which includes zones A-F. Zones A-F represent areas that each share a common property insurance premium. Because zones A-F have been determined based on the magnitude of all perils in a particular zone, the insurance premium for each zone more accurately reflects the potential for perils to occur in a particular zone.

A basic by-peril premium equation may be expressed as follows:

$$P_{basic\ by\text{-}peril} = [Q][R_z][B_z] + C$$

P represents a premium that is arrived at through use of the equation. Q, which varies based on rating characteristics of a particular customer, represents a product of rating plan relativities that are not by-peril. $R_z$ is a product of rating plan relativities that is derived from by-peril rating plans for a zone z. The rating plan relativities that are a part of $R_z$ are derived by taking a weighted average of rating plan relativities that are by-peril with the weights equal to the by-peril magnitudes in the zone. $R_z$ may be calculated for combined zones, or for an entire territory or state. In such a case, the weights are equal to the by-peril magnitudes in the combined zones or the whole state. $R_z$ varies depending on rating characteristics of the applicant and the property.

The basic by-peril equation also incorporates a base rate, $B_z$, which is derived from by peril information. $B_z$ represents a zone base rate for zone z. $B_z$ is the product of the statewide base rate multiplied by a zone relativity that is equal to a weighted average of by-peril territorial relativities with the weights equal to the by-peril magnitudes in the state. Finally, C represents an additive premium that may be added to the premium based on endorsements and surcharges, for example.

A modified by-peril premium equation may be expressed as follows:

$$P_{modified} = [Q][R_z]\{[S_1][B_{1z}] + [S_2][B_{2z}] + \ldots + [S_n][B_{nz}]\} + C$$

The modified by-peril premium equation further enhances the basic by-peril methodology by using factors that improve the resolution of the solutions even more than the basic by peril equation. In the modified by-peril premium equation, Q, which varies depending on rating characteristics of a customer, represents a product of rating plan relativities not by peril. $R_z$ represents a product of rating plan relativities derived from by peril rating plans for zone z. The rating plan relativities that make up $R_z$ are derived by taking a weighted average of rating plan relatives that are by peril, with the weights equal to the by peril magnitudes in the zone. $R_z$ may be calculated for combined zones, or even for the whole state, in which case the weights are equal to the by peril magnitudes in the combined zones or the whole state. $R_z$ varies depending on rating characteristics of the applicant and the property.

The factor $S_i$ is a product of rating plans that are by peril for peril I, where i is equal to 1 through n, where n is the number of perils. $S_i$ varies depending on rating characteristics of applicant. The factor $B_{iz}$ represents a zone base rate in zone z, where i is equal to 1 through n, where n is the number of perils. $B_{iz}$ is equal to the product of the state base rate for peril i ($B_i$) and the territorial relativity for peril i in territory z ($T_{iz}$). Accordingly, $B_{iz} = B_i * T_{iz}$. Finally, C represents an additive premium that may be added to the premium based on endorsements and surcharges, for example.

System Configuration

Figure 5:
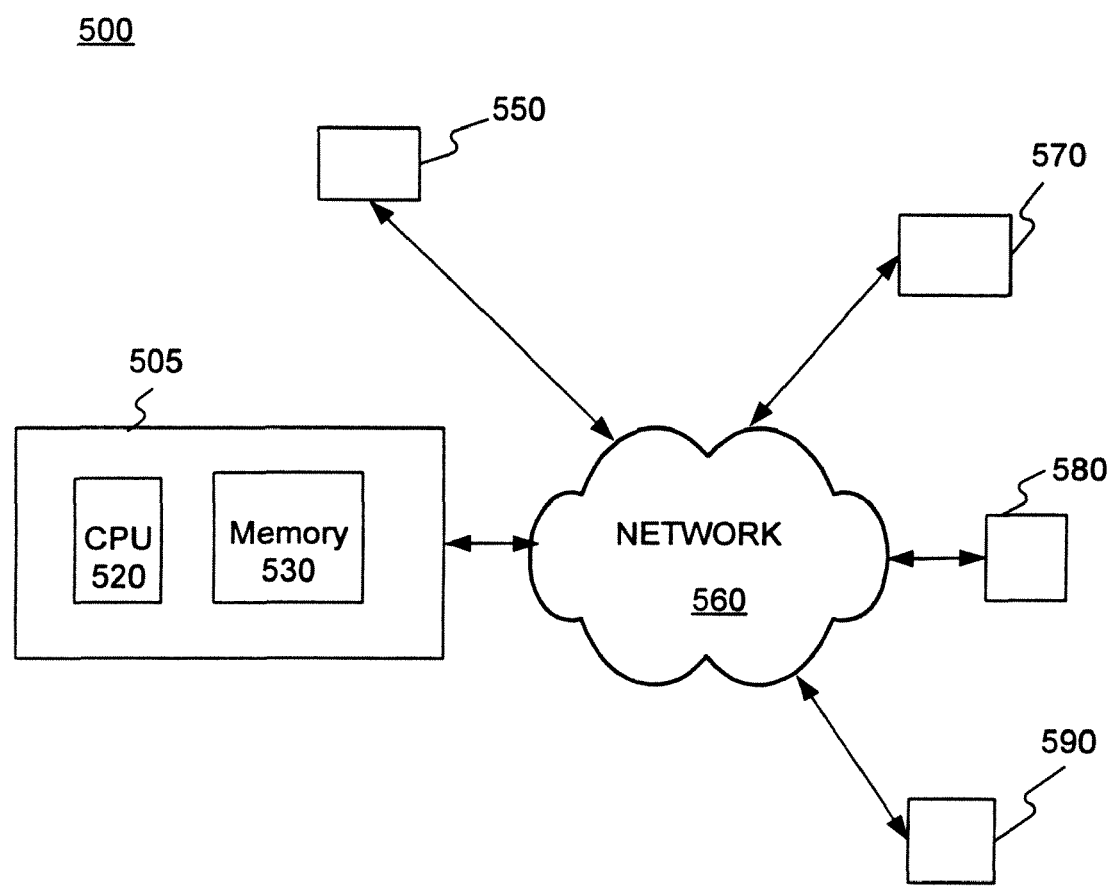
FIG. 5 illustrates a system consistent with the present invention.

FIG. 5 illustrates a system 500 consistent with the present invention. System 500 includes a server 505, connected to a network 560, including a CPU 520 and a memory 530. Software loaded into memory 530 from, for example, a disk drive (not shown) at the direction of CPU 520 may be used to implement a program for determining insurance premiums for property. Various program modules may be stored in memory 530 as software for implementing the functionality of the present invention. For example, program modules may correspond to one or more of the steps described more fully above. While FIG. 5 shows a network environment, one skilled in the art will recognize that the present invention may be implemented using any appropriate data processing system.

Network 560 provides communications between the various entities in system 500, such as user terminals 570-590. Network 560 may be a shared, public, or private network and encompass a wide area or local area. Further, network 560 may be implemented through any suitable combination of wired and/or wireless communication networks. By way of example, network 560 may be implemented through a wide area network (WAN), local area network (LAN), an intranet, or the Internet.

Terminals 570-590 allow a user to exchange information with server 560. Terminals 570-590 may be any type of appropriate device for communicating with server 505 over network 560. For example, terminal 570 may be a PDA running a program for communicating with server 505, while terminal 580 may be a desktop type computer running a web browser for communicating with sever 505 via the Internet. Terminal 790 may be a standard landline telephone or wireless phone.

Users may access server 505 via network 560 to determine insurance premiums for property through a web browser running on, for example, terminal 580. A website may include options for specify a customer's location, and may present the user with a series of screens prompting the user to make various selections.

Additionally, a user at terminal 590, a telephone, may contact a customer service representative at terminal 550. The customer service representative may make selections using software running on terminal 550, and may send data to and from server 505, when determining the customer's insurance premium.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A method for establishing insurance premiums, the method comprising:
   creating a plurality of peril zones for each of a plurality of perils based on magnitudes of loss costs for each peril, wherein the magnitudes of the loss costs for one of the plurality of perils within one of the plurality of peril zones are roughly equivalent;
   combining, using a processor, the plurality of peril zones for the plurality of perils to create a plurality of all-peril zones, each of the all-peril zones being an overlapping intersection of one of the plurality of peril zones from each of the plurality of perils; and
   setting insurance premiums for the plurality of all-peril zones.

2. The method of claim 1, wherein creating the plurality of peril zones comprises using a statistical smoothing technique to create boundaries of the plurality of peril zones.

3. The method of claim 1, further comprising receiving the loss costs for the plurality of perils.

4. The method of claim 3, further comprising sorting the loss costs on a per-peril basis.

5. The method of claim 1, further comprising receiving insurance premium payments from a policyholder based on the insurance premiums set for the plurality of all-peril zones.

6. The method of claim 1, wherein the loss costs represent historic costs by an insurance company in settling policyholders' claims.

7. A system for establishing insurance premiums, the system comprising:
   a storage storing loss costs for a plurality of perils;
   a processor executing instructions to perform a method comprising:
   creating a plurality of peril zones for each of the plurality of perils based on magnitudes of the loss costs for each peril, wherein the magnitudes of the loss costs for one of the plurality of perils within one of the plurality of peril zones are roughly equivalent;
   combining the plurality of peril zones for the plurality of perils to create a plurality of all-peril zones, each of the all-peril zones being an overlapping intersection of one of the plurality of peril zones from each of the plurality of perils; and
   setting insurance premiums for the plurality of all-peril zones.

8. The system of claim 7, wherein creating the plurality of peril zones comprises using a statistical smoothing technique to create boundaries of the plurality of peril zones.

9. The system of claim 7, wherein the method further comprises receiving the loss costs for the plurality of perils.

10. The system of claim 9, wherein the method further comprises sorting the loss costs on a per-peril basis.

11. The system of claim 7, wherein the method further comprises receiving insurance premium payments from a policyholder based on the insurance premiums set for the plurality of all-peril zones.

12. The system of claim 7, wherein the loss costs represent historic costs by an insurance company in settling policyholders' claims.

13. A computer readable storage medium storing instructions executable by a processor for performing a method for establishing insurance premiums, the method comprising:
   creating a plurality of peril zones for each of a plurality of perils based on magnitudes of loss costs for each peril, wherein the magnitudes of the loss costs for one of the plurality of perils within one of the plurality of peril zones are roughly equivalent;
   combining the plurality of peril zones for the plurality of perils to create a plurality of all-peril zones, each of the all-peril zones being an overlapping intersection of one of the plurality of peril zones from each of the plurality of perils; and
   setting insurance premiums for the plurality of all-peril zones.

14. The medium of claim 13, wherein creating the plurality of peril zones comprises using a statistical smoothing technique to create boundaries of the plurality of peril zones.

15. The medium of claim 13, wherein the method further comprises receiving the loss costs for the plurality of perils.

16. The medium of claim 15, wherein the method further comprises sorting the loss costs on a per-peril basis.

17. The medium of claim 13, wherein the method further comprises receiving insurance premium payments from a policyholder based on the insurance premiums set for the plurality of all-peril zones.

18. The medium of claim 13, wherein the loss costs represent historic costs by an insurance company in settling policyholders' claims.

* * * * *